United States Patent
Shimizu

(10) Patent No.: US 9,824,028 B2
(45) Date of Patent: Nov. 21, 2017

(54) CACHE METHOD AND CACHE APPARATUS

(71) Applicant: FUJITSU LIMITED, Kawasaki-shi, Kanagawa (JP)

(72) Inventor: Toshihiro Shimizu, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 571 days.

(21) Appl. No.: 14/494,217

(22) Filed: Sep. 23, 2014

(65) Prior Publication Data

US 2015/0106570 A1    Apr. 16, 2015

(30) Foreign Application Priority Data

Oct. 10, 2013  (JP) ................................ 2013-212613

(51) Int. Cl.

| G06F 12/00 | (2006.01) |
|---|---|
| G06F 12/121 | (2016.01) |
| G06F 12/12 | (2016.01) |
| G06F 12/0891 | (2016.01) |
| G06F 12/0866 | (2016.01) |
| G06F 12/122 | (2016.01) |

(52) U.S. Cl.
CPC ........ *G06F 12/121* (2013.01); *G06F 12/0891* (2013.01); *G06F 12/12* (2013.01); *G06F 12/0866* (2013.01); *G06F 12/122* (2013.01)

(58) Field of Classification Search
None
See application file for complete search history.

(56) References Cited

U.S. PATENT DOCUMENTS

2009/0172679 A1*  7/2009  Yoshida .............. G06F 12/0862
                                                                    718/102

FOREIGN PATENT DOCUMENTS

| JP | 02-219147 | 8/1990 |
|---|---|---|
| JP | 2002-049528 | 2/2002 |
| JP | 2002-516446 | 6/2002 |
| WO | 99/60564 | 11/1999 |

\* cited by examiner

*Primary Examiner* — Midys Rojas
(74) *Attorney, Agent, or Firm* — Fujitsu Patent Center

(57) ABSTRACT

A cache apparatus stores part of a plurality of accessible data blocks into a cache area. A calculation part calculates, for each pair of data blocks of the plurality of data blocks, an expected value of the number of accesses made after one of the data blocks is accessed until the other of the data blocks is accessed, on the basis of a probability that when each of the plurality of data blocks is accessed, each data block that is likely to be accessed next is accessed next. When a data block is read from outside the cache area, a determination part determines a data block to be discarded from the cache area, on the basis of the expected value of the number of accesses made after the read data block is accessed until each of the plurality of data blocks is accessed.

8 Claims, 15 Drawing Sheets

ADDRESS CONVERSION TABLE 33

| PAGE NO. | ADDRESS ON HDD |
|---|---|
| 1 | #2 |
| 2 | #3 |
| 3 | #1 |
| 4 | #4 |
| ⋮ | ⋮ |

FIG. 4

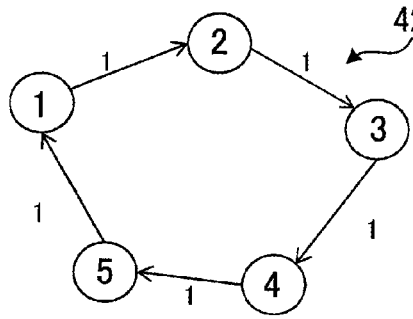

42 STATE TRANSITION DIAGRAM

EXPECTED VALUE OF LENGTH TO WHEN PAGE 3 IS ACCESSED $$A = \begin{pmatrix} 0 & 1 & 0 & 0 & 0 \\ 0 & 0 & 1 & 0 & 0 \\ 0 & 0 & 0 & 1 & 0 \\ 0 & 0 & 0 & 0 & 1 \\ 1 & 0 & 0 & 0 & 0 \end{pmatrix} \Rightarrow B = \begin{pmatrix} 0 & 1 & 0 & 0 & 0 \\ 0 & 0 & 0 & 0 & 0 \\ 0 & 0 & 0 & 1 & 0 \\ 0 & 0 & 0 & 0 & 1 \\ 1 & 0 & 0 & 0 & 0 \end{pmatrix}$$

CHANGE ALL ELEMENTS IN THIRD COLUMN TO 0

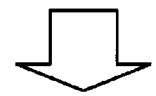

$$(I - B)^{-1} = \begin{pmatrix} 1 & 1 & 0 & 0 & 0 \\ 0 & 1 & 0 & 0 & 0 \\ 1 & 1 & 1 & 1 & 1 \\ 1 & 1 & 0 & 1 & 1 \\ 1 & 1 & 0 & 0 & 1 \end{pmatrix}$$

$$(I - B)^{-1} \times \begin{pmatrix} 1 \\ 1 \\ 1 \\ 1 \\ 1 \end{pmatrix} = \begin{pmatrix} 2 \\ 1 \\ 5 \\ 4 \\ 3 \end{pmatrix}$$

FIG. 9

STATE TRANSITION DIAGRAM

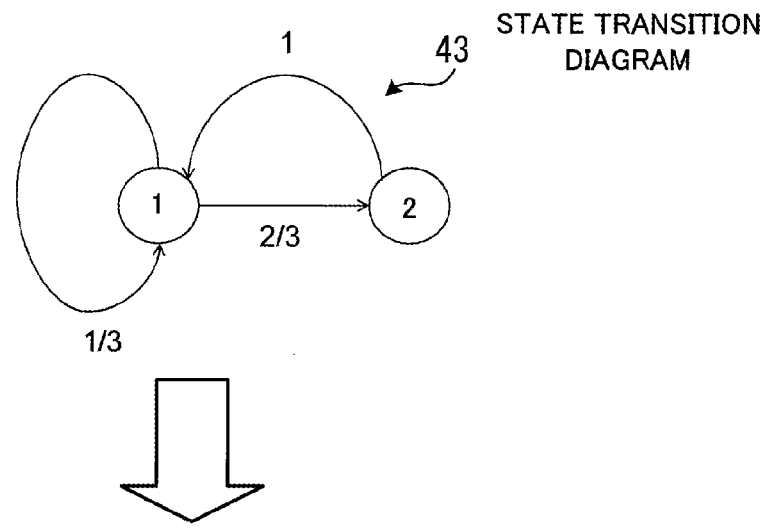

(1) CALCULATION USING EQUATION

EXPECTED VALUE OF OCCUPANCY SEQUENCE LENGTH FOR TRANSITION FROM 1 TO 2 : x $$x=(1/3)\times(x+1)+(2/3)\times 1$$
$$(2/3)x=1$$
$$x=3/2=1.5$$

(2) CALCULATION USING MATRIX $$A = \begin{pmatrix} 1/3 & 2/3 \\ 1 & 0 \end{pmatrix} \Rightarrow B = \begin{pmatrix} 1/3 & 0 \\ 1 & 0 \end{pmatrix} \Rightarrow (I-B)^{-1} = \begin{pmatrix} 3/2 & 0 \\ 3/2 & 1 \end{pmatrix}$$

$$\begin{pmatrix} 3/2 & 0 \\ 3/2 & 1 \end{pmatrix} \times \begin{pmatrix} 1 \\ 1 \end{pmatrix} = \begin{pmatrix} 1.5 \\ 2.5 \end{pmatrix}$$

FIG. 10

35 PRIORITY ORDER INFORMATION

EXPECTED VALUE
RANKING TABLE

35a — PAGE: 1

| PAGE NO. | EXPECTED VALUE |
|---|---|
| 4 | 3.2 |
| 10 | 5.8 |
| 2 | 10.9 |
| 7 | 25.3 |

35b — PAGE: 2

| PAGE NO. | EXPECTED VALUE |
|---|---|
| 3 | 4.2 |
| 1 | 8.4 |
| 4 | 19.6 |
| 9 | 20.7 |

35c — PAGE: 3

| PAGE NO. | EXPECTED VALUE |
|---|---|
| 2 | 5.2 |
| 10 | 8.2 |
| 1 | 21.8 |
| 6 | 30.9 |

CACHE METHOD AND CACHE APPARATUS

CROSS-REFERENCE TO RELATED APPLICATION

This application is based upon and claims the benefit of priority of the prior Japanese Patent Application No. 2013-212613, filed on Oct. 10, 2013, the entire contents of which are incorporated herein by reference.

FIELD

The embodiments discussed herein are related to a cache method and a cache apparatus.

BACKGROUND

Computers have various types of storage devices with different performances. For example, computers have a small, fast memory (such as a random access memory (RAM) or the like), and a large, slow memory (such as a hard disk drive (HDD) or the like). In the computers, frequently accessed data are stored in a fast-access storage device as far as possible so as to allow fast access. This technique is called cache. In the storage area of such a fast-access storage device, the area for temporarily holding the data read from a slow storage device is called a cache area.

When accessing data, if the data is stored in the cache area, an access is made to the cache area. When the data to be accessed is found in the cache area, it is called a cache hit. On the other hand, if the data to be accessed is not stored in the cache area, the data is read from the slow storage device. When the data to be accessed is not found in the cache area, it is called a cache miss.

In many cases, the capacity of the fast storage device is small, and hence the capacity of the cache area is limited. Therefore, data stored in the cache vary depending on the data that are accessed. When replacing data stored in the cache area, determining which data to remove is important in improving the cache hit rate. That is, the strategy (cache algorithm) for determining which data to remove greatly affects the computer performance.

As one of cache algorithms, there is an algorithm called least recently used (LRU), for example. This algorithm discards, from the cache area, the data that has not been used for the longest period of time since the last use.

In some situations where computers are used, it is possible to predict to some extent which data will be accessed next, based on the data that was called before access to the data. For example, in the case of browsing information using social networking services (SNSs) or World Wide Web (WWW), it is possible to predict that any of pages linked from the page that is currently being browsed will be browsed next. Further, by recording the percentage of each linked page being previously selected, it is possible to predict the probability of each linked page being browsed next. In this way, when it is possible to predict to some extent which page will be accessed next, the cache hit rate may be improved by effectively using the probability of each data item being accessed next.

For example, as a technique related to a cache algorithm using the probability of each data item being read, there has been disclosed a technique using a Markov chain. According to this technique, the probability of each data item being used is calculated assuming that the locality of a program on a storage device is based on a Markov chain. Thus, a data item with a low probability of being used is selected as a data item to be replaced.

Please see, for example, Japanese Laid-open Patent Publication No. 2-219147

However, the conventional cache algorithm using the probability of each data item being accessed next takes into consideration only the probability in the next access, and therefore is sometimes not sufficiently effective to improve the cache hit rate. For example, there may be a case where it is obvious that, when a data item is accessed, a specific data item will not be accessed in the following access but will be accessed with a high probability in the second following access. In this case, if the conventional technique is used, since the probability that the specific data item which will be accessed in the second following access (access after the next access) with a high probability will be read in the next access is 0, the specific data item might be removed from the cache area. Thus, when an attempt to access the specific data item is made in the second following access, a cache miss occurs, which results in a reduced cache hit rate.

Thus, the conventional cache algorithm using the probability of each data item being read next is not sufficiently effective to improve the cache hit rate.

SUMMARY

According to one aspect of the invention, there is provided a computer-readable storage medium storing a caching program that causes a computer to execute a process including: storing part of a plurality of accessible data blocks into a cache area of a storage device, calculating, for each pair of data blocks of the plurality of data blocks, an expected value of a number of accesses made after one of the data blocks is accessed until the other one of the data blocks is accessed, based on a probability that when each of the plurality of data blocks is accessed, each data block that is likely to be accessed next is accessed next; and determining, in response to a data block being read from outside the cache area according to an access request to the data block, a data block to be discarded from the cache area, based on the expected value of the number of accesses made after the read data block is accessed until each of the plurality of data blocks is accessed.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 illustrates an example of an address conversion table;

FIG. 9 illustrates an example of calculating an expected value;

FIG. 10 illustrates an example of calculating an expected value using an equation;

FIG. 11 illustrates an example of priority order information;

DESCRIPTION OF EMBODIMENTS

Figure 1:
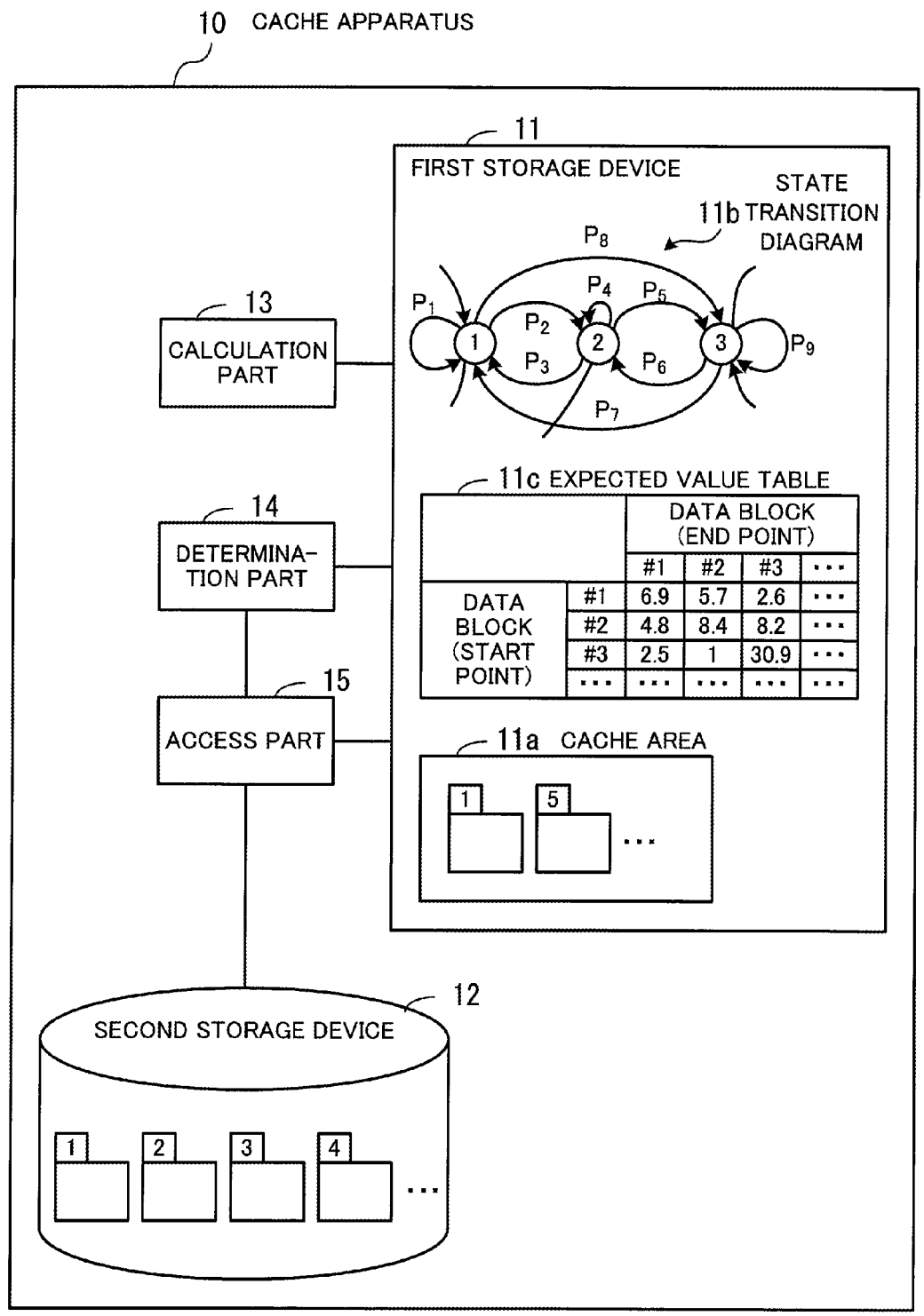
FIG. 1 illustrates an exemplary functional configuration of a cache apparatus according to a first embodiment.

Several embodiments will be described below with reference to the accompanying drawings, wherein like reference numerals refer to like elements throughout. Note that features of certain embodiments may be combined with features of other embodiments as long as no inconsistency arises.

(a) First Embodiment

First, a description will be given of a first embodiment.

FIG. 1 illustrates an exemplary functional configuration of a cache apparatus 10 according to the first embodiment. The cache apparatus 10 includes a first storage device 11 and a second storage device 12. The first storage device 11 has a smaller storage capacity than the second storage device 12, but is able to provide faster access. Accordingly, part of the storage area of the first storage device 11 is used as a cache area 11a. The cache area 11a temporarily holds part of data obtained from the second storage device 12. This allows the data held in the cache area 11a to be read at a higher speed compared with the case of being read from the second storage device 12. Note that the unit of data read from the second storage device 12 when data in the second storage device 12 are accessed is hereinafter referred to as a data block.

In the first embodiment, in order to use the cache area 11a effectively, the probability that when each of a plurality of accessible data blocks is accessed, each data block that is likely to be accessed next is accessed next is defined in advance. The relationship between the probabilities of access to data blocks may be defined by, for example, an automaton, and the automaton may be represented by a state transition diagram 11b. The state transition diagram 11b represents the transition probability to an access state, for each data block as a unit of access in the second storage device 12. Each state in the state transition diagram 11b is associated with an access operation to each data block in the second storage device 12. Then, probabilities ($P_1$ through $P_9$) of, after accessing a given data block, accessing the other data blocks as transitions of the state in the state transition diagram 11b are set. The state transition diagram 11b is stored in advance in, for example, the first storage device 11.

The cache apparatus 10 determines a data block to be discarded from the cache area 11a based on transitions in access to data blocks illustrated in the state transition diagram 11b. In order to appropriately determine a data block to be discarded, the cache apparatus 10 includes a calculation part 13, a determination part 14, and an access part 15.

The calculation part 13 calculates, for each pair of data blocks of the plurality of data blocks in the second storage device 12, a value which is expected as the number of accesses made after one of the data blocks is accessed until the other one of the data blocks is accessed. The value which is expected as the number of accesses is hereinafter referred to as an "expected value".

In calculation of expected values, two expected values corresponding to two cases that differ in the order in which two data blocks are accessed are obtained for each pair. For example, in the case of a pair of a "data block a" and a "data block b", the expected value of the number of accesses made after the "data block a" is accessed until the "data block b" is accessed is obtained as a first expected value. Then, the expected value of the number of accesses made after the "data block b" is accessed until the "data block a" is accessed is obtained as a second expected value. In this way, the calculation part 13 calculates an expected value for each permutation formed by selecting two data blocks from a plurality of data blocks in the second storage device 12. A permutation is an ordered arrangement of a predetermined number of elements selected from a set.

When creating pairs of data blocks, the calculation part 13 may create a pair of the same data block. In this case, the calculation part 13 calculates an expected value for each repeated permutation of a plurality of data blocks. Note that a repeated permutation is a permutation that is created under the condition that the same element may be repeatedly selected.

Calculation of expected values is performed based on, for example, transitions in access to data blocks illustrated in the state transition diagram 11b. For example, the calculation part 13 detects all the paths of state transition that is made after one data block of a pair is accessed until the other data block is accessed, based on the state transition diagram 11b. Then, the calculation part 13 multiplies, for each path, all the transition probabilities along the path, and multiplies the product of the transition probabilities by the number of transitions. Then, the calculation part 13 determines the sum of the values obtained for the respective paths as an expected value.

Expected values may be calculated by calculating a matrix. For example, the calculation part 13 generates a transition matrix, based on the probability that when each of a plurality of data blocks is accessed, each data block that is likely to be accessed next is accessed next. Then, the calculation part 13 calculates expected values by performing a matrix calculation using the generated transition matrix.

The calculation part 13 creates, for example, an expected value table 11c in which the calculated expected values are registered. The expected value table 11c holds, for each pair of data blocks of the plurality of data blocks in the second storage device 12, an expected value of the number of accesses made after one of the data blocks (a start point) is accessed until the other one of the data blocks (an end point) is accessed, in table form. The calculation part 13 stores the created expected value table 11c into, for example, the first storage device 11.

The determination part 14 determines a data block to be discarded from the cache area 11a, when a data block is read from outside the cache area 11a in response to an access request to the data block. For example, the determination part 14 determines a data block to be discarded from the cache area 11a, based on the expected value of the number of accesses made after the read data block is accessed until each of the plurality of data blocks is accessed. For example, the determination part 14 determines a data block having the highest expected value as the data block to be discarded.

The access part 15 accesses data in response to an access request. For example, the access part 15 reads a data block to be accessed from the second storage device 12, and outputs the read data block as a response to the access request. In the case where the data block to be accessed is stored in the cache area 11*a*, the access part 15 reads the data block from the cache area 11*a*, instead of reading the data block from the second storage device 12.

In the case where the data block is read from the second storage device 12, the access part 15 stores the read data block into the cache area 11*a*. In this step, the access part 15 checks the free space in the cache area 11*a*. If the free space is less than or equal to a predetermined amount, the access part 15 discards the data block that is determined by the determination part 14 as a data block to be discarded, among the data blocks stored in the cache area 11*a*.

According to the cache apparatus 10 described above, the calculation part 13 calculates expected values based on transitions in access to data blocks represented by the state transition diagram 11*b*. Thus, the expected value table 11*c* in which the calculated expected values are set is created. Then, in response to an access request, the access part 15 reads a data block from the second storage device 12, and the determination part 14 determines which of the plurality of data blocks stored in the cache area 11*a* is to be discarded. For example, the access part 15 selects, as a data block to be discarded, a data block specified as the end point and having the highest expected value when the read data block is specified as the start point, among data blocks stored in the cache area 11*a*. If the cache area 11*a* is short of free space, the access part 15 discards the data block to be discarded from the cache area 11*a*, and then stores the data block read from the second storage device 12 into the cache area 11*a*.

In this way, the data blocks having the highest expected value when the read data block is specified as the start point is discarded from the cache area 11*a*, with priority. The data block having the highest expected value is a data block that is likely to need the greatest number of accesses thereafter so as to be accessed. In other words, data blocks that are likely to need a small number of accesses thereafter so as to be accessed remain in the cache area 11*a*. This increases the likelihood that a data block to be accessed is stored in the cache area 11*a* when an access is made in response to a future access request. That is, the cache hit rate is increased. Thus, the efficiency of accessing data blocks is improved.

Note that the cache apparatus 10 may determine in advance a priority order for discard of, upon reading a given data block from outside the cache area 11*a*, the other data blocks. In this case, the cache apparatus 10 may store information indicating the priority order for discard into the first storage device 11, in place of the expected value table 11*c*. In the case where the priority order for discard is determined in advance, when a data block is read from outside the cache area 11*a*, the determination part 14 determines a data block to be discarded, based on the priority order for discard upon reading the data blocks. In this way, since the priority order is determined in advance, it is easy to determine a data block to be discarded, and the processing efficiency is improved.

When storing the priority order, pieces of identification information of a predetermined number of data blocks having the lowest expected values are arranged in the priority order for discard, and the arranged pieces of identification information are stored into the first storage device 11. In this case, when a given data block is read from outside the cache area 11*a*, if a data block that is not assigned a priority level for discard upon reading the given data block is present in the cache area 11*a*, the determination part 14 determines the data block that is not assigned a priority level as a data block to be discarded. If a data block that is not assigned a priority level for discard is not present in the cache area 11*a*, the determination part 14 determines a data block having the highest priority among the data blocks stored in the cache area 11*a* as a data block to be discarded. In this way, since only the pieces of identification information of a predetermined number of data blocks having the lowest expected values are stored as the priority order, it is possible to reduce the storage space used for storing the priority order. Further, since a large number of data blocks not assigned priority levels are determined to have the highest priorities, the efficiency of determining a data block to be discarded is improved.

If the probabilities of transitions between data blocks that are accessed are modeled as a Markov chain, the calculation part 13 calculates expected values based on the transition probabilities in a Markov chain in which an access to a data block is defined as a state transition. A Markov chain is a Markov process whose possible states are discrete. A Markov process is a stochastic process in which the future behavior is dependent only on the current value, and is independent of the past behavior.

The Markov chain may be a first-order Markov chain (simple Markov chain) or may be a higher-order Markov chain (N-order Markov chain). In the case of a higher-order Markov chain, for example, a plurality of accesses to a predetermined number of data blocks are defined as a state transition in the Markov chain. By obtaining expected values using a higher-order Markov chain, it is possible to determine a more appropriate data block as a data block to be discarded, according to transitions between data blocks that are accessed.

In calculation of expected values, expected values may be approximated. By approximating expected values, the processing load for calculating expected values is reduced.

Note that the calculation part 13, the determination part 14, and the access part 15 of FIG. 1 may be realized by, for example, the processor of the cache apparatus 10. The first storage device 11 may be realized by, for example, the memory such as RAM or the like of the cache apparatus 10. The second storage device 12 may be realized by, for example, the HDD of the cache apparatus 10.

The lines connecting the components of FIG. 1 represent some of communication paths. Communication paths other than those of FIG. 1 may be provided.

(b) Second Embodiment

The following describes a second embodiment. In the second embodiment, the expected value is obtained using a first-order Markov chain. In the following description of the second embodiment, a first-order Markov chain is simply referred to as a "Markov chain". Further, in the second embodiment, data are accessed in units of pages.

The following describes a computer 100 according to the second embodiment.

Figure 2:
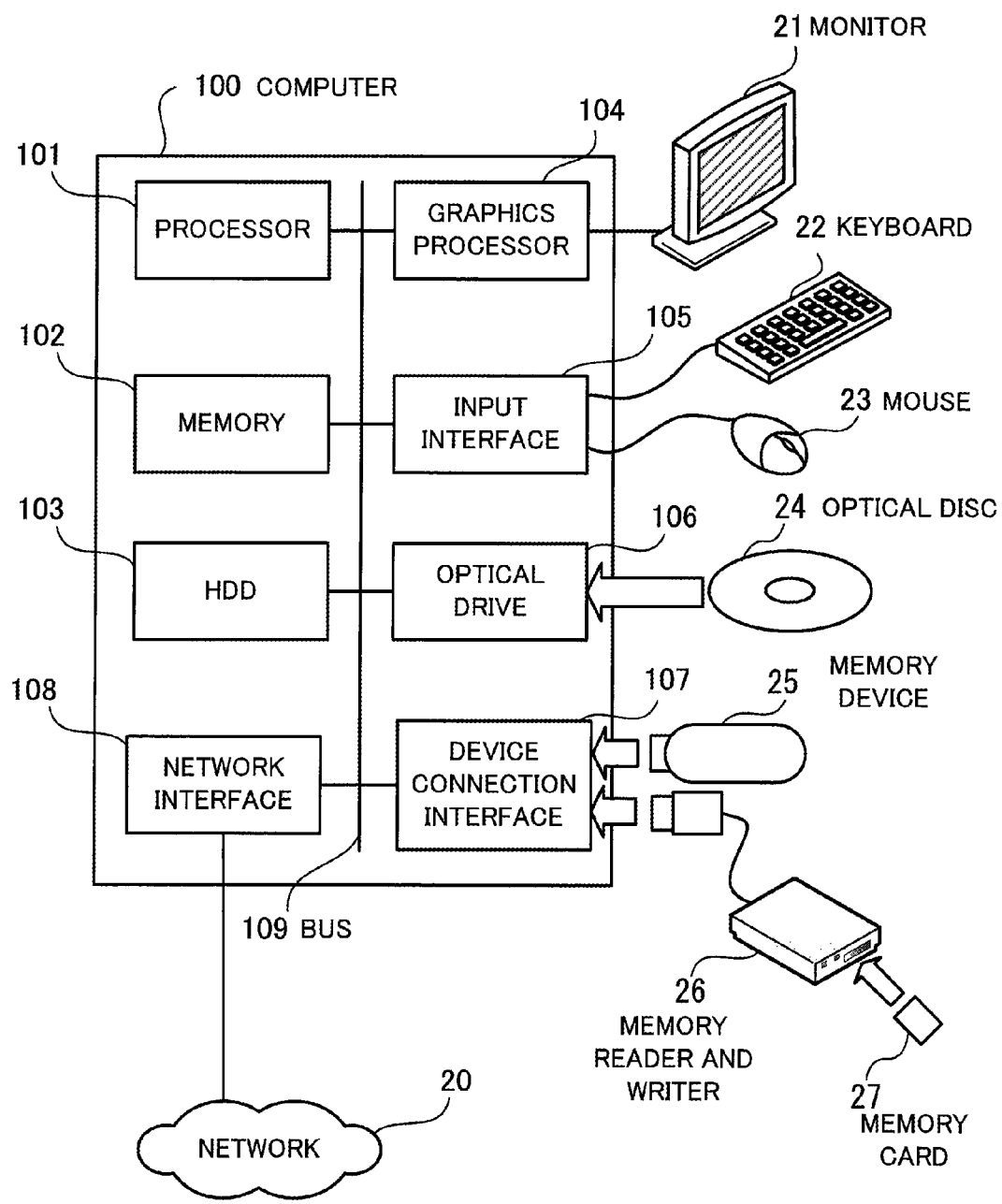
FIG. 2 illustrates an exemplary hardware configuration of a computer used in a second embodiment.

FIG. 2 illustrates an exemplary hardware configuration of the computer 100 used in the second embodiment. The entire operation of the computer 100 is controlled by a processor 101. A memory 102 and a plurality of peripheral devices are connected to the processor 101 via a bus 109. The processor 101 may be a multiprocessor. Examples of the processor 101 include a central processing unit (CPU), a micro processing unit (MPU), and a digital signal processor (DSP). The functions of the processor 101 may be implemented wholly or partly by using electronic circuits such as an application-specific integrated circuit (ASIC), a programmable logic device (PLD), and the like.

The memory 102 is used as a primary storage device of the computer 100. The memory 102 temporarily stores therein at least part of the operating system (OS) program and application programs that are executed by the processor 101. The memory 102 also stores therein various types of data used for processing performed by the processor 101. Further, part of data stored in the HDD 103 in units of pages is cached into the memory 102. The memory 102 may be, for example, a volatile semiconductor storage device such as a RAM and the like.

The peripheral devices connected to the bus 109 include an HDD 103, a graphics processor 104, an input interface 105, an optical drive 106, a device connection interface 107, and a network interface 108.

The HDD 103 magnetically writes data to and reads data from its internal disk. The HDD 103 is used as a secondary storage device of the computer 100. The HDD 103 stores therein the OS program, application programs, and various types of data. Note that a non-volatile semiconductor storage device such as a flash memory and the like may be used as a secondary storage device.

A monitor 21 is connected to the graphics processor 104. The graphics processor 104 displays an image on the screen of the monitor 21 in accordance with an instruction from the processor 101. Examples of the monitor 21 include a display device using a cathode ray tube (CRT), a liquid crystal display device, and the like.

A keyboard 22 and a mouse 23 are connected to the input interface 105. The input interface 105 receives signals from the keyboard 22 and the mouse 23, and transmits the received signals to the processor 101. The mouse 23 is an example of a pointing device, and other types of pointing devices may also be used. Examples of other types of pointing devices include a touch panel, a tablet, a touch pad, a track ball, and the like.

The optical drive 106 reads data from an optical disc 24 by using laser beams or the like. The optical disc 24 is a portable storage medium on which data is recorded such that the data may be read through optical reflection. Examples of the optical disc 24 include digital versatile disc (DVD), DVD-RAM, compact disc read only memory (CD-ROM), CD-Recordable (CD-R), CD-Rewritable (CD-RW), and the like.

The device connection interface 107 is a communication interface that connects peripheral devices to the computer 100. For example, a memory device 25 and a memory reader and writer 26 may be connected to the device connection interface 107. The memory device 25 is a storage medium having a function to communicate with the device connection interface 107. The memory reader and writer 26 is a device that writes data to and reads data from a memory card 27. The memory card 27 is a card-type storage medium.

The network interface 108 is connected to a network 20. The network interface 108 exchanges data with other computers or communication apparatuses via the network 20.

With the hardware configuration described above, it is possible to realize the processing functions of the second embodiment. Note that, the cache apparatus 10 of the first embodiment may be realized with a hardware configuration similar to that of the computer 100 of FIG. 2.

The computer 100 realizes the processing functions of the second embodiment by executing a program stored in a computer-readable storage medium, for example. The program describing the procedure to be performed by the computer 100 may be stored into various storage media. For example, the program to be executed by the computer 100 may be stored into the HDD 103. The processor 101 loads at least part of the program from the HDD 103 into the memory 102 so as to execute the program. The program to be executed by the computer 100 may also be stored into a portable storage medium, such as the optical disc 24, the memory device 25, the memory card 27, and the like. The program stored in the portable storage medium may be executed after being installed into the HDD 103 under the control of, for example, the processor 101. Further, the processor 101 may execute the program by reading the program directly from the portable recording medium.

The following describes functions used by the computer 100 for caching data in units of pages from the HDD 103 into the memory 102.

Figure 3:
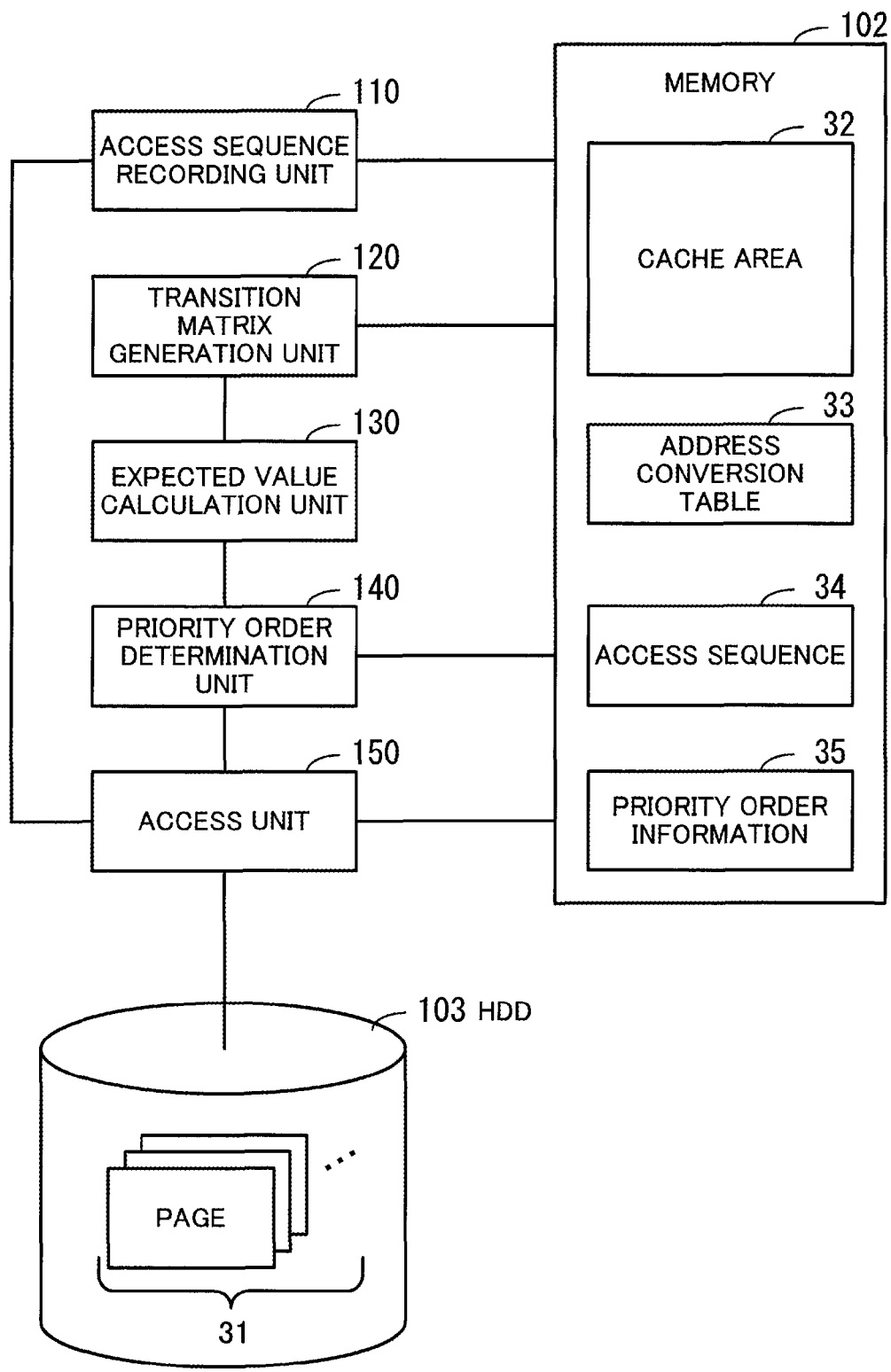
FIG. 3 is a block diagram illustrating a cache function.

FIG. 3 is a block diagram illustrating a cache function. As illustrated in FIG. 3, a plurality of pages 31 are stored in the HDD 103. The HDD 103 is accessed for reading or writing in units of pages.

The memory 102 includes a cache area 32. Some of the plurality of pages 31 stored in the HDD 103 are stored in the cache area 32. Further, the memory 102 holds an address conversion table 33, an access sequence 34, and priority order information 35. The address conversion table 33 is information indicating a correspondence between the page number of a page and the location on the HDD 103 where the page is stored. The access sequence 34 is information generated based on the previous page accesses and indicating the order in which pages are accessed. The priority order information 35 is information indicating the priority order of pages to be forced out of (removed from) the cache area when each page is read.

The computer 100 further includes, as functions used for caching pages, an access sequence recording unit 110, a transition matrix generation unit 120, an expected value calculation unit 130, a priority order determination unit 140, and an access unit 150.

The access sequence recording unit 110 records, in the memory 102, the order in which pages are read as the access sequence 34. For example, every time the access unit 150 reads a page from the HDD 103, the access sequence recording unit 110 adds the page number of the read page to the end of the access sequence 34.

The transition matrix generation unit 120 generates a transition matrix based on the access sequence 34. A transition matrix is a matrix representing the transition probabilities based on a Markov chain.

The expected value calculation unit 130 calculates, for each state (state after page access) in a Markov chain, an expected value of the number of transitions (the number of accesses) that are made for moving from the state to each of the other states, based on the transition matrix. The greater the expected value, the greater the number of page accesses that are likely to be made until transition to the state. Note that the number of transitions that are made for moving from one state to another state corresponds to a period of time during which a page in the cache area 32 corresponding to the other state continues to occupy the cache area 32 until the next access to the page. The occupancy period is represented by the length in the access sequence 34. Thus, a length from one state to another state in the access sequence 34 is referred to as an occupancy sequence length.

An expected value of an occupancy sequence length may be hereinafter simply referred to as an expected value.

The priority order determination unit 140 determines, for each state, the priority order of pages to be discarded upon transition to the state, based on the expected value of the occupancy sequence length from the state to each of the other states. For example, in the case where a page having a high expected value of the occupancy sequence length is retained in the cache area 32, the page occupies a part of the cache area 32 without being used for a long period of time. This reduces the usage efficiency (cache hit rate) of the cache area 32. Accordingly, the priority order determination unit 140 determines the priority order such that a page having a higher expected value of the occupancy sequence length has a higher priority to be discarded. The priority order determination unit 140 stores the determined priority order as priority order information 35 into the memory 102.

The access unit 150 accesses the cache area 32 of the memory 102 or the HDD 103 in response to an access request, and acquires data in units of pages. For example, if the page specified by the access request is stored in the cache area 32, the access unit 150 acquires the page from the cache area 32. If the page specified by the access request is not stored in the cache area 32, the access unit 150 acquires the page from the HDD 103. In the case where the page is read from the HDD 103, the access unit 150 stores the page into the cache area 32.

When the cache area 32 becomes full, the access unit 150 discards a page from the cache area 32 so as to make free space. For example, the access unit 150 discards a page having the highest priority of discard with respect to the last accessed page, among the pages stored in the cache area 32. Note that discarding a page is a process of changing the attribute of the area where the page is stored from "occupied" to "free".

Note that the lines connecting the components in FIG. 3 represent some of communication paths. Communication paths other than those of FIG. 3 may be provided. Further, the memory 102 is an example of the first storage device 11 of the first embodiment of FIG. 1. The HDD 103 is an example of the second storage device 12 of the first embodiment of FIG. 1. A combination of the functions of the transition matrix generation unit 120 and the expected value calculation unit 130 is an example of the calculation part 13 of the first embodiment of FIG. 1. The priority order determination unit 140 is an example of the determination part 14 of the first embodiment of FIG. 1. The access unit 150 is an example of the access part 15 of the first embodiment of FIG. 1.

The following describes the address conversion table 33 that is stored in advance in the memory 102.

FIG. 4 illustrates an example of the address conversion table 33. The address conversion table 33 holds an address on the HDD in association with a page number. When accessing a page, the access unit 150 confirms the correspondence between the page in the HDD 103 and the page number, by referring to the address conversion table 33. For example, upon receiving an access request specifying a page number from a process or the like that executes an application program, the access unit 150 acquires the address on the HDD 103 corresponding to the specified page number, by referring to the address conversion table 33. Then, the access unit 150 reads a page from the acquired address on the HDD 103.

When an access is made in units of pages, the access sequence recording unit 110 creates an access sequence 34.

Figure 5:
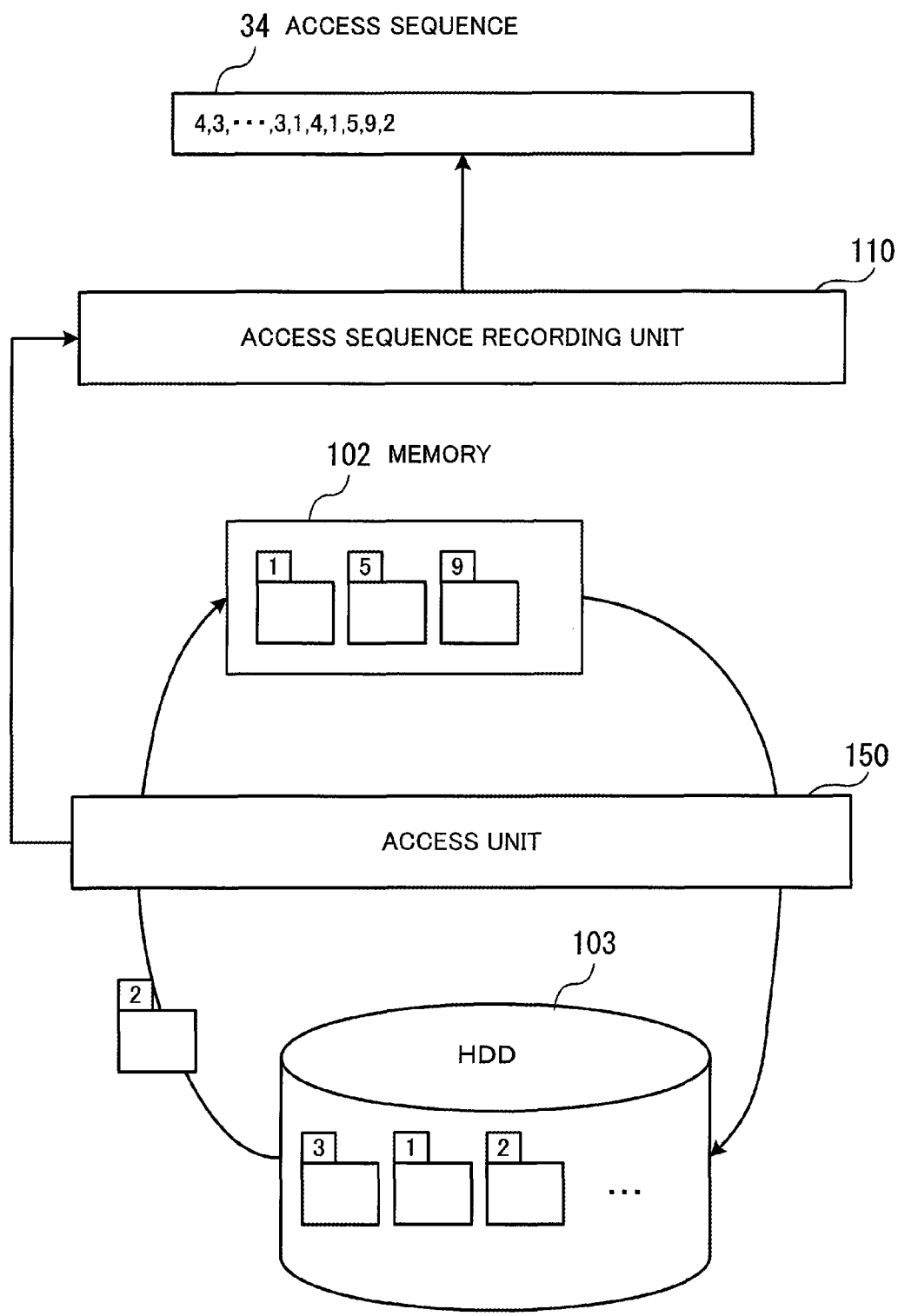
FIG. 5 illustrates how an access sequence is created.

FIG. 5 illustrates how the access sequence 34 is created. As depicted in FIG. 5, the access sequence 34 is an access order list in which the page numbers of the accessed pages are arranged in order of access.

The access unit 150 accesses a page in the cache area 32 of the memory 102 or the HDD 103 in response to an access request. In the example of FIG. 5, the page with the page number "2" in the HDD 103 is accessed and read into the memory 102. The access unit 150 outputs, for example, part of the page or the entire page that is specified by the access request as a response to the access request.

The access sequence recording unit 110 monitors the access process of the access unit 150, and acquires the page number of the page accessed by the access unit 150. Then, the access sequence recording unit 110 adds the acquired page number to the end of the access sequence 34.

In this way, each time a page is accessed, the access sequence 34 is updated. In the example of access illustrated in FIG. 5, accesses are made to pages stored in the HDD 103. However, if a page to be accessed is stored in the cache area 32 of the memory 102, an access is made to the page in the cache area 32. Even in the case where a page in the cache area 32 is accessed, the access sequence recording unit 110 updates the access sequence 34.

Based on the thus generated access sequence 34, a chain matrix representing a Markov chain is created. With use of the chain matrix, it is possible to appropriately determine the priority order of pages to be discarded from the cache area 32. The access unit 150 determines a page to be discarded from the cache area 32 in accordance with the priority order. Note that if the content of a page has been updated, the access unit 150 writes the updated page to the HDD 103.

Figure 6:
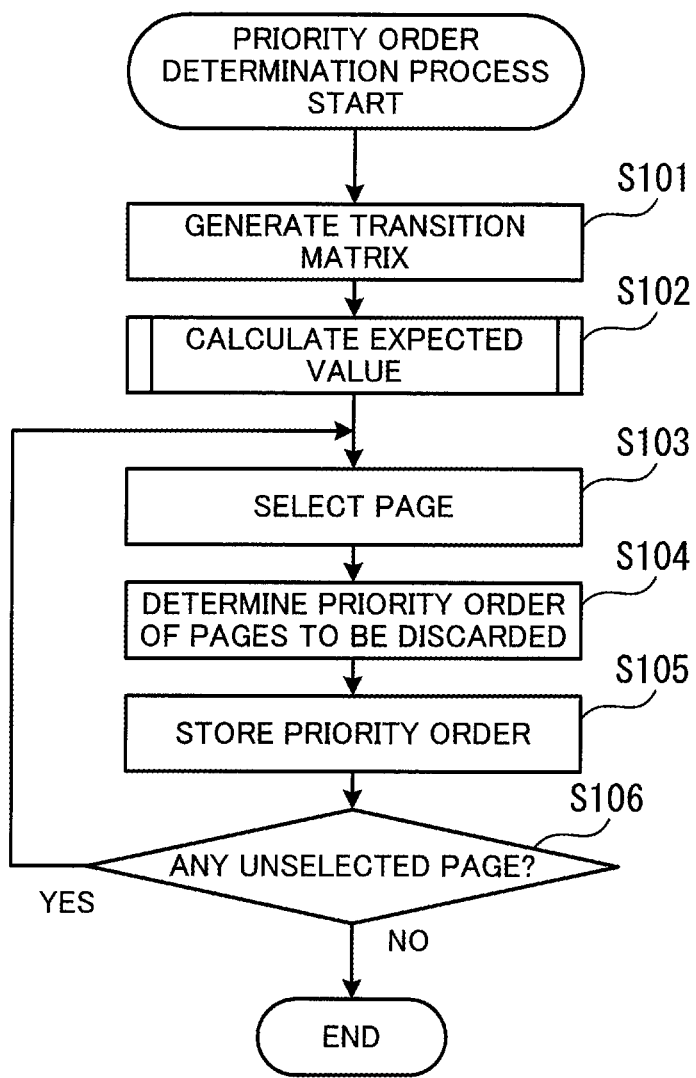
FIG. 6 is a flowchart illustrating a priority order determination process.

FIG. 6 is a flowchart illustrating a priority order determination process. The priority order determination process is periodically performed at predetermined intervals, for example. The priority order determination process may also be performed when the cache hit rate in the cache area 32 becomes equal to or lower than a predetermined value.

(Step S101) The transition matrix generation unit 120 generates a transition matrix based on the access sequence 34. The transition matrix generation unit 120 transmits the generated transition matrix to the expected value calculation unit 130.

(Step S102) The expected value calculation unit 130 calculates the expected values of occupancy sequence lengths, based on the transition matrix. In calculating expected values, each of the plurality of pages in the HDD 103 is specified as the most recent access target page. Then, expected values are calculated for each pair of the most recent access target page and a page other than the last accessed page. The expected value calculation unit 130 transmits the calculated expected values to the priority order determination unit 140. Note that the expected value calculation process will be described below in detail (see FIG. 8).

(Step S103) The priority order determination unit 140 selects one of unselected pages in the HDD 103.

(Step S104) The priority order determination unit 140 determines a priority order of pages to be discarded from the cache area 32, based on the expected value of the occupancy sequence length of each page in the HDD 103 in the case where the selected page is specified as the most recent access target page.

(Step S105) The priority order determination unit 140 stores the determined priority order into the memory 102.

(Step S106) The priority order determination unit 140 determines whether any of the pages has not been selected.

If there is an unselected page, the process proceeds to step S103. If all the pages have been selected, the priority order determination process ends.

In this way, it is possible to determine the priority order for discard of pages from the cache area 32.

The following describes a method of generating a Markov matrix of a Markov chain in detail.

The transition matrix generation unit 120 calculates, for each page, a probability of transition from the page to each transition destination page, based on the access sequence 34. For example, the transition matrix generation unit 120 specifies a given page as the transition source, and calculates the probability that when the transition source page is read, each page is read next. More specifically, the transition matrix generation unit 120 first detects the page number of the transition source page from the access sequence 34. Then, the transition matrix generation unit 120 extracts the page number following the detected page number. The number of times that extraction of a page number is performed is defined as the total number of transitions. Then, the transition matrix generation unit 120 divides, for each page number, the number of times that the page number is extracted by the total number of transitions. The quotient is the transition probability from the transition source page to each page. This calculation of transition probabilities is performed for each page while specifying each page in the HDD 103 as the transition source.

Then, the transition matrix generation unit 120 generates a transition matrix of a Markov chain, based on the transition probabilities between pages.

Figure 7:
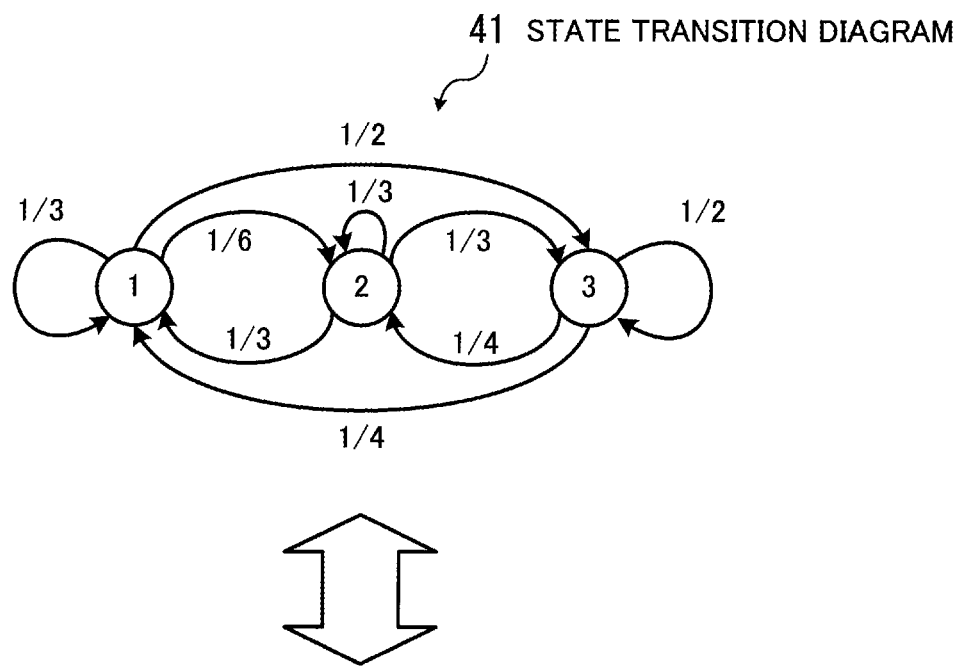
FIG. 7 illustrates a Markov chain.

FIG. 7 illustrates a Markov chain. In a Markov chain, the probability of transition from a state i (i is an integer equal to or greater than 1) to the next state j (j is an integer equal to or greater than 1) is a probability $a_{ij}$. For example, the state i is a state in which a page A is read, and the state j is a state in which another page B is read. The probability $a_{ij}$ is the probability that when the page A is read, the page B is read next.

A Markov chain may be represented by a state transition diagram 41. In the state transition diagram 41, nodes indicating states are connected by arcs (arrows). In each node, the page number of a page corresponding to the state is indicated. Further, next to each arc, the probability of transition along the arc is indicated. In the example of FIG. 7, the probability of transition from the page with the page number "1" to the same page with the page number "1" is "1/3". The probability of transition from the page with the page number "1" to the page with the page number "2" is "1/6". The probability of transition from the page with the page number "1" to the page with the page number "3" is "1/2".

The transition matrix generation unit 120 generates a transition matrix A representing the probabilities of transitions between pages illustrated in the state transition diagram 41. If there are three possible states, the transition matrix A is a 3-by-3 square matrix. The element in row i, column j of the transition matrix A represents the probability $a_{ij}$ of transition from the state i to the state j. In the example of FIG. 7, the element "1/6" in the first row and the second column represents the probability of transition from a state "1" to a state "2". The sum of the elements in each row in the transition matrix A is "1".

In the above description, a transition matrix is generated based on statistical analysis on the access sequence 34. However, if the transition probabilities are already known, a transition matrix may be generated using the known transition probabilities. For example, if the conditions of transitions between pages are determined by random walks on a graph, a transition matrix may be generated based on the transition probabilities calculated from the graph. Note that a random walk is a process where the next transition destination state is selected randomly (at random) in terms of probability.

A row vector $P_t$ representing the probability of being in each state at time t is defined as "$P_t = P_{t-1} A$". If there are three pages, there are three possible states. Thus, the row vector $P_t$ contains three elements associated with the three pages. Each of the three elements represents the probability of being in a state in which the corresponding page is read at time t. $P_{t-1}$ is a row vector representing the probability of being in each state at time (t-1) immediately before time t. Thus, by multiplying the row vector representing the probability of being in each state at a given time by the transition matrix A from the right, the probability of being in each state after one transition is obtained.

The expected value calculation unit 130 calculates the expected values of occupancy sequence lengths, based on the transition matrix A generated by the transition matrix generation unit 120.

Figure 8:
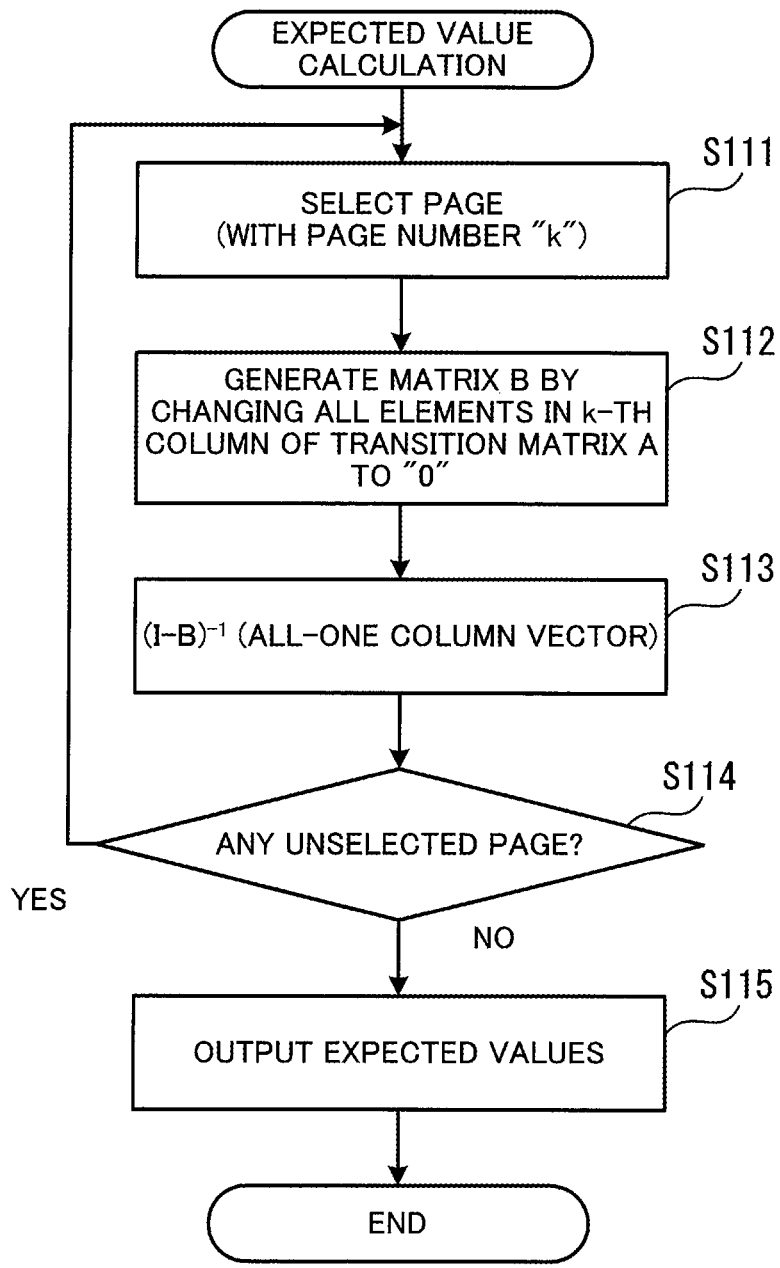
FIG. 8 illustrates an expected value calculation procedure.

FIG. 8 illustrates an expected value calculation procedure.

(Step S111) The expected value calculation unit 130 selects one of unselected pages stored in the HDD 103. Here, the page number of the selected page is k (k is an integer equal to or greater than 1).

In the following steps S112 through S114, the expected value of the occupancy sequence length from when another page is accessed to when the selected page is accessed is calculated.

(Step S112) The expected value calculation unit 130 generates a matrix B by changing all the elements in the k-th column of the transition matrix A to "0".

(Step S113) The expected value calculation unit 130 calculates (inverse matrix of "I-B")×(all-one column vector). Here, I is an identity matrix. The result of this calculation is the expected value of the occupancy sequence length from when each page in the HDD 103 is accessed to when the page with the page number "k" is accessed.

(Step S114) The expected value calculation unit 130 determines whether any of the pages stored in the HDD 103 has not been selected. If there is an unselected page, the process proceeds to step S111. If calculation of the expected value has been performed for all the pages, the process proceeds to step S115.

(Step S115) The expected value calculation unit 130 outputs all the calculated expected values. The output expected values are transmitted to the priority order determination unit 140.

In this manner, the expected values of occupancy sequence lengths are calculated.

FIG. 9 illustrates an example of calculating an expected value. In the example of FIG. 9, a Markov chain of a state transition diagram 42 is illustrated. In this Markov chain, there are five pages. If the page with the page number "1" is accessed, then the page with the page number "2" is accessed next with a probability of "1". If the page with the page number "2" is accessed, then the page with the page number "3" is accessed next with a probability of "1". If the page with the page number "3" is accessed, then the page with the page number "4" is accessed next with a probability of "1". If the page with the page number "4" is accessed, then the page with the page number "5" is accessed next with a probability of "1". If the page with the page number "5" is accessed, then the page with the page number "1" is accessed next with a probability of "1". In a transition matrix A representing the Markov chain of the state transition diagram 42, the elements in the first row and the second column, the second row and the third column, the third row and the fourth column, the fourth row and the fifth column, and the fifth row and the first column are "1", while the other elements are "0".

In the case of calculating the expected value of each occupancy sequence length to when the page with the page number "3" is accessed, the expected value calculation unit 130 generates a matrix B by changing all the elements in the third column of the transition matrix A to "0". Then, the expected value calculation unit 130 subtracts the matrix B from a 5-by-5 identity matrix I, and generates an inverse matrix of the matrix obtained by the subtraction. Then, the expected value calculation unit 130 multiplies the generated inverse matrix by a column vector in which all the five elements are "1" from the right. In the example of FIG. 9, a column vector (2, 1, 5, 4, 3) is obtained as the product.

Each of the first through fifth elements of the obtained column vector is the expected value of the occupancy sequence length from when each of the pages with the page numbers "1" through "5" is accessed to when the page with the page number "3" is accessed. For example, the expected value of the occupancy sequence length from when the page with the page number "1" is accessed to when the page with the page number "3" is accessed is "2".

Expected values may be calculated without using a matrix.

FIG. 10 illustrates an example of calculating an expected value using an equation. A Markov chain of a state transition diagram 43 illustrated in FIG. 10 has two states. According to this state transition diagram 43, two pages are stored in the HDD 103. When the page with the page number "1" is accessed, the probability that the same page with the page number "1" is accessed next is "1/3", and the probability that the page with the page number 2 is accessed next is "2/3". When the page with the page number "2" is accessed, the probability that the page with the page number "1" is accessed next is "1".

In this example, an expected value x of the occupancy sequence length from when the page with the page number "1" is accessed to when the page with the page number "2" is accessed in this Markov chain is calculated.

First, in the case of calculating the expected value using an equation, the expected value is expressed by the following equation: $x=(1/3)\times(x+1)+(2/3)\times 1$. When this equation is solved for x, $x=1.5$. That is, "1.5" is obtained as the expected value of the occupancy sequence length from when the page with the page number "1" is accessed to when the page with the page number "2" is accessed.

On the other hand, in the case of calculating the expected value in the same Markov chain using a matrix, a transition matrix A is generated first. In this transition matrix A, the element in the first row and the first column is "1/3"; the element in the first row and the second column is "2/3"; the element in the second row and the first column is "1" and the element in the second row and the second column is "0". Then, a matrix B is generated by changing all the elements in the second column of the transition matrix A to "0". Then, an inverse matrix of I-B is calculated. The generated inverse matrix is multiplied by an all-one column vector from the right. Thus, a column vector (1.5, 2.5) is obtained. The first element of the obtained column vector is "1.5", which is the expected value of the occupancy sequence length from when the page with the page number "1" is accessed to when the page with the page number "2" is accessed. The second element of the obtained column vector is "2.5", which is the expected value of the occupancy sequence length from when the page with the page number "2" is accessed to when the page with the page number "2" is accessed again.

In this manner, it is possible to calculate the expected value of each occupancy sequence length using a matrix or an equation. Then, the priority order determination unit 140 determines, for each page, the priority order of pages to be discarded from the cache area 32 when the page is accessed. For example, a page having a higher expected value of the occupancy sequence length has a higher priority to be discarded. The priority order determination unit 140 stores the determined priority order as priority order information 35 into the memory 102.

FIG. 11 illustrates an example of priority order information 35. The priority order information 35 includes expected value ranking tables 35a, 35b, 35c, and so on for the respective pages in the HDD 103. For example, the expected value ranking table 35a is associated with the page with the page number "1". In the expected value ranking table 35a, the page numbers of the respective pages are arranged in ascending order of the expected value of the occupancy sequence length from when the page with the page number "1" is accessed to when each page is accessed. Each page number in the expected value ranking table 35a is assigned the expected value of an occupancy sequence length of the page indicated by the page number. Pages that are ranked lower in the expected value ranking table 35a have higher priorities to be discarded when the page with the page number "1" is accessed.

In the example of FIG. 11, the page numbers of a predetermined number of the pages having the lowest expected values are registered in each of the expected value ranking tables 35a, 35b, 35c, and so on. Pages that are not registered in each of the expected value ranking tables 35a, 35b, 35c, and so on are discarded with the highest priority. The number of page numbers to be registered in each of the expected value ranking tables 35a, 35b, 35c, and so on may be changed according to the magnitude of the expected value. For example, the page numbers of the pages whose expected values are less than a predetermined value may be registered in each of the expected value ranking tables 35a, 35b, 35c, and so on.

Since the priority order information 35 is created in advance, when the access unit 150 accesses a page, it is possible to select an appropriate page from the cache area and discard the page.

Figure 12:
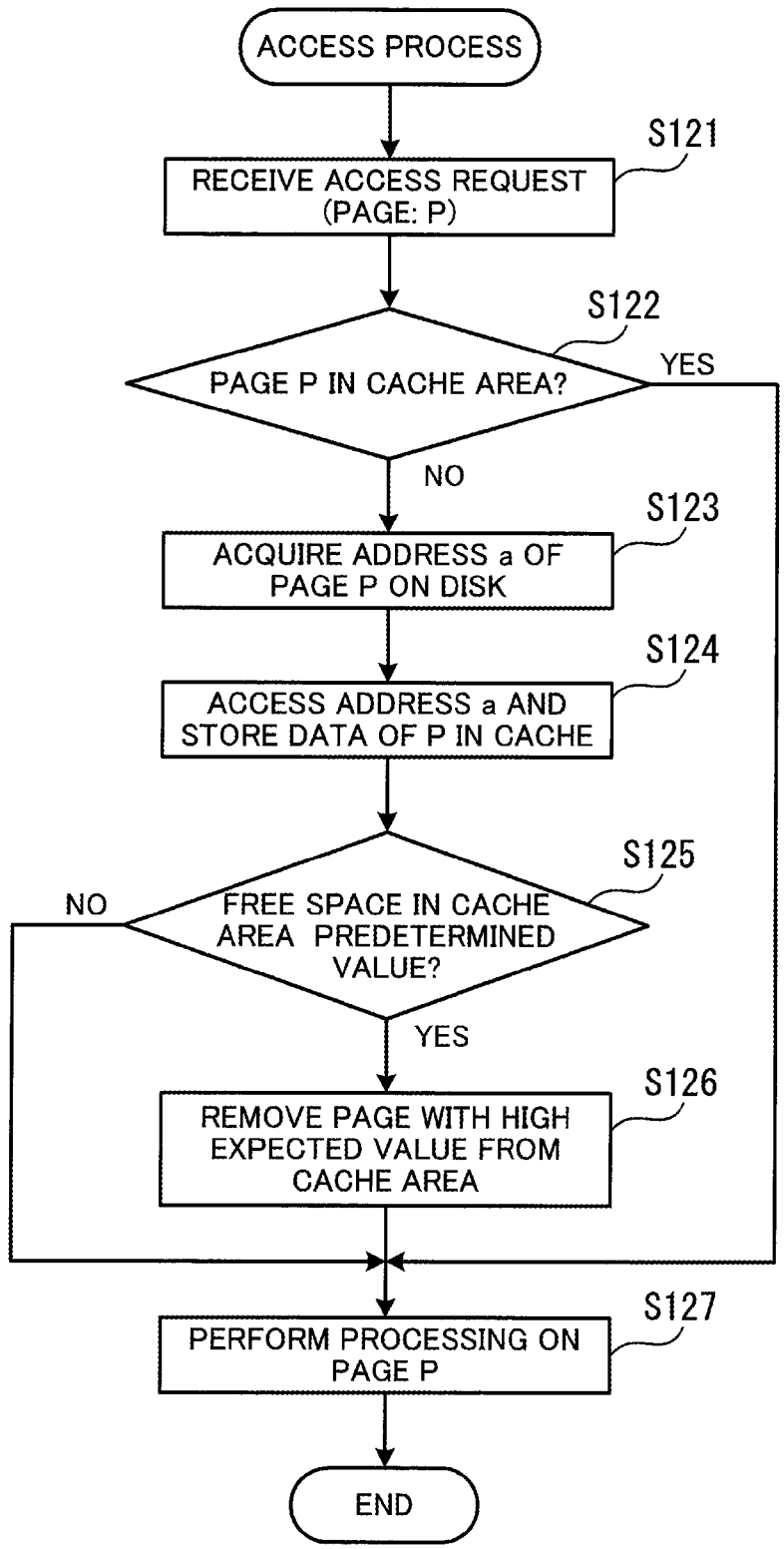
FIG. 12 is an example of a flowchart illustrating a process of accessing a page.

FIG. 12 is an example of a flowchart illustrating a process of accessing a page.

(Step S121) The access unit 150 receives an access request from a process or the like that executes an application program. The page specified by the access request as a page to be accessed is hereinafter referred to as a "page P".

(Step S122) The access unit 150 determines whether the page P is stored in the cache area 32. If the page P is stored in the cache area 32, the process proceeds to step S127. If the page P is not stored in the cache area 32, the process proceeds to step S123.

(Step S123) The access unit 150 acquires an address "a" of the page P on the disk by referring to the address conversion table 33.

(Step S124) The access unit 150 reads a page at the address "a" on the HDD 103, and stores the page into the cache area 32.

(Step S125) The access unit 150 determines whether the amount of free space in the cache area 32 is equal to or less than a predetermined value. If the amount of free space is equal to or less than the predetermined value, the process proceeds to step S126. If the amount of free space is greater than the predetermined value, the process proceeds to step S127.

(Step S126) The access unit 150 refers to an expected value ranking table corresponding to the page P. If pages that are not registered in the expected value ranking table are present in the cache area 32, the access unit 150 selects one of the pages as a page to be removed. If a page that is not registered in the expected value ranking table is not present in the cache area 32, the access unit 150 selects a page from the expected value ranking table, starting with one at the bottom, and determines whether the page is stored in the cache area 32. Then, the access unit 150 selects, as a page to be discarded, the lowest ranked page (the page having the highest expected value) in the expected value ranking table among the pages stored in the cache area 32. Then, the access unit 150 removes, from the cache area 32, the page selected as a page to be removed. If the content of the page to be removed has been updated, the access unit 150 writes the page to the HDD 103.

(Step S127) The access unit 150 performs processing on the page P. For example, if the access request is a request for reading part of the data in the page P, the access unit 150 outputs the data as a response to the access request. On the other hand, if the access request is a request for writing data to the page P, the access unit 150 writes the data to the page P in the cache area 32.

In this way, when the page that will be accessed is predictable based on the last accessed page, it is possible to remove an appropriate page from the cache area and improve the cache hit rate.

The following describes the advantages over other cache algorithms.

Figure 13:
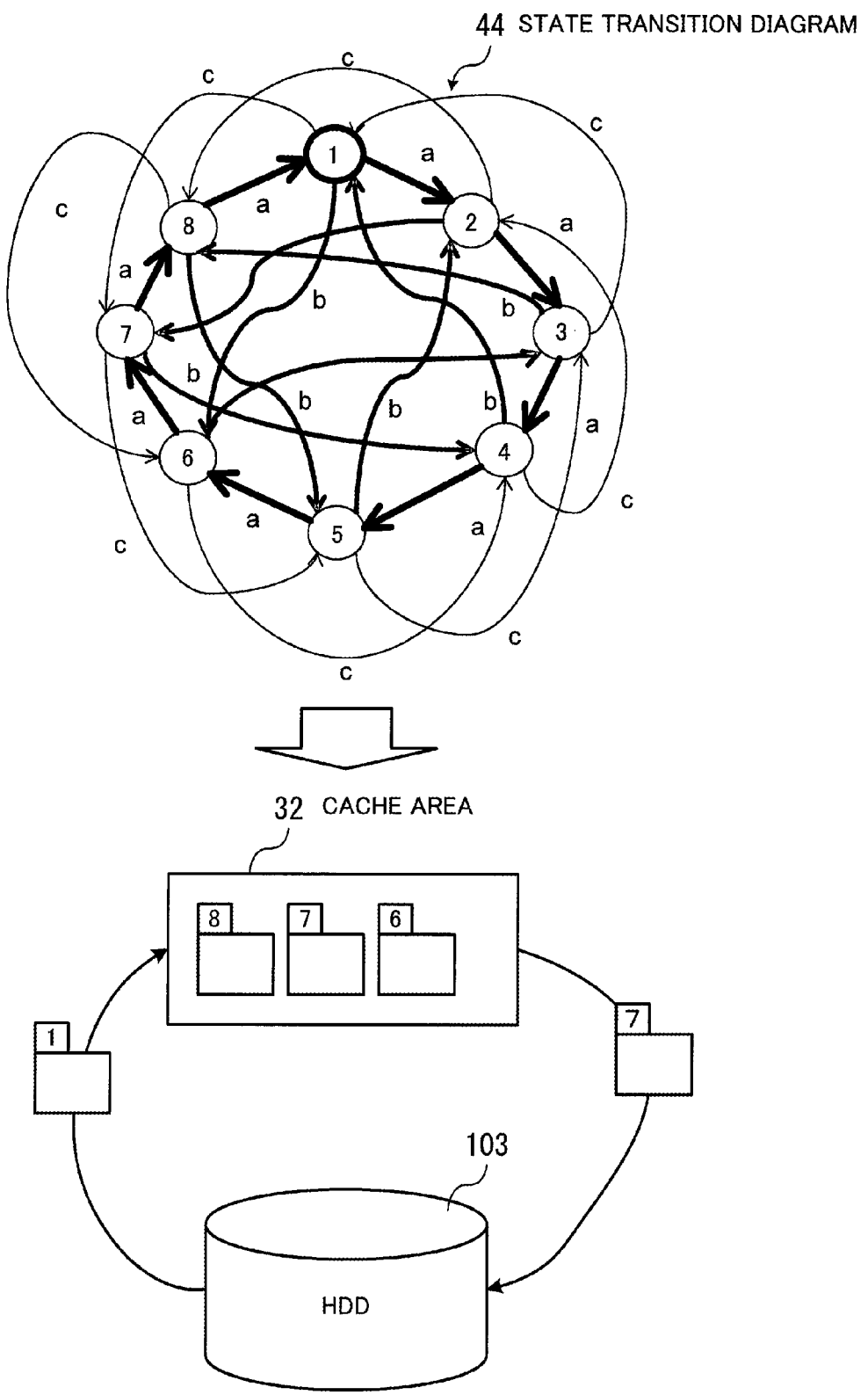
FIG. 13 illustrates the differences from a LRU cache algorithm.

FIG. 13 illustrates the differences from an LRU cache algorithm. A Markov chain of a state transition diagram 44 illustrated in FIG. 13 has eight states. That is, it is assumed that eight pages are stored in the HDD 103. The eight pages are arranged in order of page number, and the page with the page number "8" is followed by the page with the page number "1". In this case, the probability that when each page is accessed, the page with the immediately following page number is accessed next is "a". The probability that the page with the third preceding page number is accessed next is "b". The probability that the page with the second preceding page number is accessed next is "c". Here, a is greater than b, and b is greater than c (a>>b>>c). The pages with page numbers "6", "7", and "8" are stored in the cache area 32. It is assumed that, under this condition, the page with the page number "1" is accessed, and is read from the HDD 103.

In this case, if the page to be discarded is determined in accordance with LRU without using the cache algorithm of the second embodiment, the least recently accessed page among the three pages with the page numbers "6", "7", and "8" is discarded. Accordingly, the page with the page number "6" is discarded from the cache area 32. However, according to the state transition diagram 44, when the page with the page number "1" is accessed, the page with the page number "6" is accessed next with a probability of "b". On the other hand, the probability that when the page with the page number "1" is accessed, the page with the page number "7" is accessed next is "c". Further, the probability that when the page with the page number "1" is accessed, the page with the page number "8" is accessed next is "0". Since "b>>c", it is not appropriate that the page with the page number "6" is discarded with priority over pages with the page numbers "7" and "8".

The following describes the case where the cache algorithm of the second embodiment is applied in the example of FIG. 13. In the second embodiment, the page to be discarded is determined taking into consideration the transition probabilities indicated in the state transition diagram 44. For example, the expected values of pages with the page number "6" and the page with the page number "7" are compared. The page with the page number "6" is accessed next with a probability of "b", and the page with the page number "7" is accessed next with a probability of "c". Here, "b>>c". Accordingly, it is highly likely that a plurality of accesses are made to other pages until the next access to the page with the page number "7". Accordingly, the page with the page number "7" has a higher expected value than the page with the page number "6". Thus, the page with the page number "7" is discarded with priority over the page with the page number "6". Note that if the page with the page number "8" has a higher expected value than the page with the page number "7", the page with the page number "8" is discarded.

In this way, in the case where the cache algorithm of the second embodiment is applied, it is possible to discard an appropriate page by effectively using transition probabilities in a Markov chain, and thus to increase the usage efficiency of the cache area compared to the case of LRU. Further, in the second embodiment, expected values of occupancy sequence lengths are calculated based on not only the transition probability from the currently accessed page to each page in the next access, but also the transition probabilities in a plurality of accesses that follow, and then a page to be discarded is calculated based on the expected values. Therefore, it is possible to further increase the usage efficiency of the cache area 32.

Figure 14:
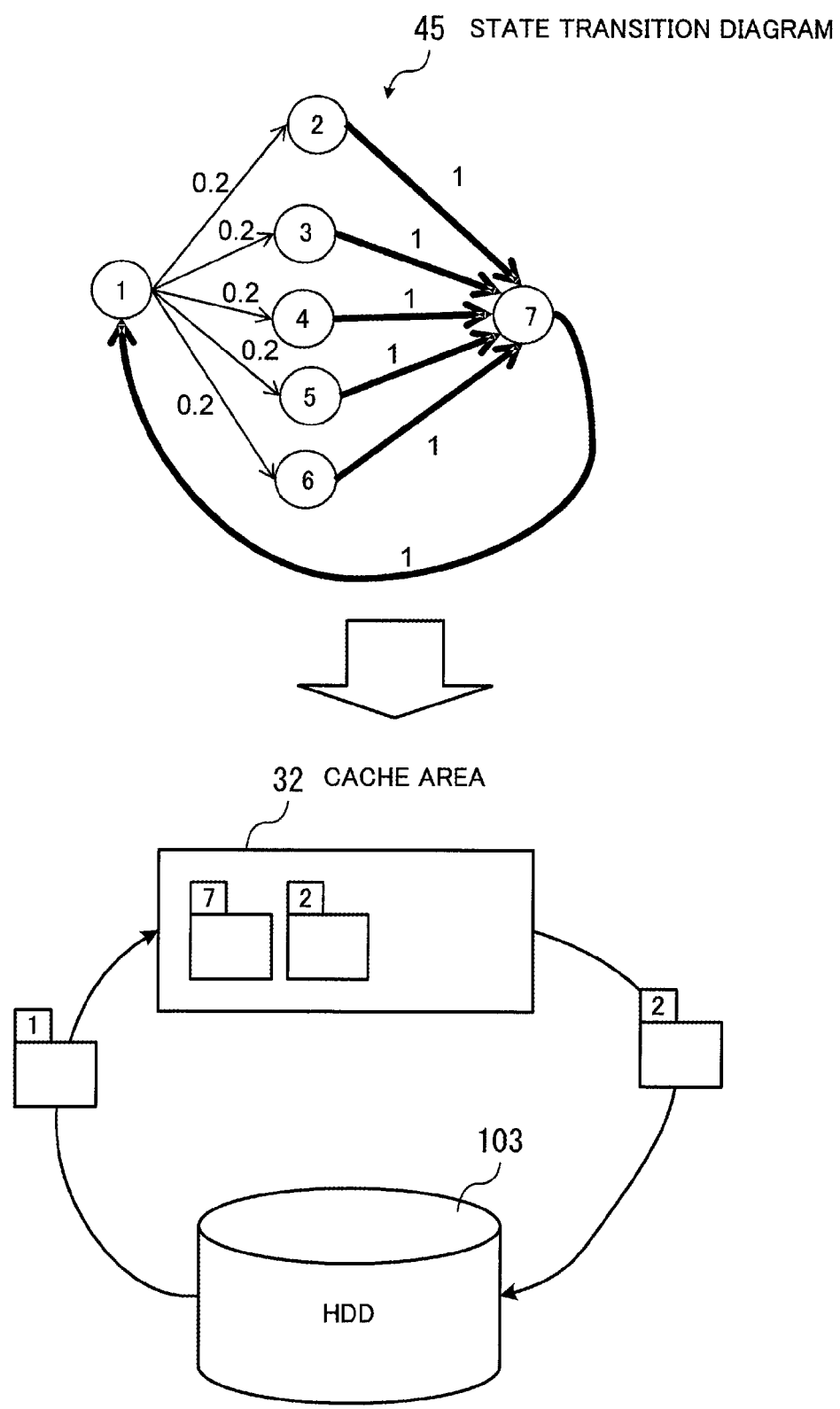
FIG. 14 illustrates the differences from an algorithm that takes into consideration only the transition probability to each page in the next access.

FIG. 14 illustrates the differences from an algorithm that takes into consideration only the transition probability to each page in the next access. A Markov chain of a state transition diagram 45 illustrated in FIG. 14 has seven states. That is, it is assumed that seven pages are stored in the HDD 103. If the page with the page number "1" is accessed, then one of five pages with the page numbers "2" through "6" is accessed next with an equal probability of "0.2". If one of the pages with the page numbers "2" through "6" is accessed, then the page with the page number "7" is accessed next with a probability of "1". If the page with the page number "7" is accessed, then the page with the page number "1" is accessed next with a probability of "1". Here, it is assumed that the pages with the page numbers "7" and "2" are stored in the cache area 32. Further, it is assumed that, under this condition, the page with the page number "1" is accessed, and is read from the HDD 103.

First, a description will be given of the case of determining a page to be discarded using an algorithm that takes into consideration only the transition probability to each page in the next access. In this case, for example, the page having the lowest probability of being accessed next is discarded. In the example of FIG. 14, the page with the page number "2" is accessed next with the probability of "0.2", but there is no possibility that the page with the page number "7" is accessed next. Accordingly, the page with the page number "7" is discarded. However, the page with the page number "7" is accessed in the second following access with a probability of "100%". That is, if the page with the page number "7" is discarded when the page with the page number "1" is accessed, a cache miss hit occurs in the second following access (the access after the next access). This lowers the processing efficiency.

The following describes the case where the cache algorithm of the second embodiment is applied in the example of FIG. 14. In the second embodiment, the expected value of each occupancy sequence length is calculated for each page, based on transition probabilities in a plurality of accesses.

The expected values of each pages with the page numbers "2" through "6" are all expressed by a series "1×(⅕)+4×(⅘)×(⅕)+7×(⅘)×(⅘)×(⅕)+ . . . ". By calculating this series, "13" is obtained. That is, the expected values of the pages with the page numbers "2" through "6" are "13". The page with the page number "7" is accessed in the second following access. Accordingly, the expected value of the page with the page number "7" is "2". Thus, in the example of FIG. 14, the page with the page number "2" is discarded. Since the page with the page number "7" is not discarded, a cache hit always occurs in the second following access, which improves the processing efficiency.

Further, in the second embodiment, a reference value of an occupancy sequence length is calculated and the priority order information 35 is created in advance. This eliminates the need of calculating a reference value at the time of accessing a page. Thus, it is possible to efficiently determine a page to be discarded. In particular, calculation of an inverse matrix is calculation of the order of the fourth power of n ($O(n^4)$) where n (n is an integer equal to or greater than 1) is the number of pages, and thus a heavy processing load is imposed. Since a reference value is calculated in advance, it is possible to determine a page to be discarded very efficiently compared to the case of calculating a reference value involving calculation an inverse matrix each time a page is accessed.

(c) Third Embodiment

The following describes a third embodiment. In the third embodiment, a page to be discarded from a cache area is determined using a higher-order Markov chain. The following describes the differences between the second and third embodiments. The configurations of the hardware and the cache function for realizing the third embodiment are the same as those of the second embodiment illustrated in FIGS. 2 and 3.

In the second embodiment, a first-order Markov chain is used. In a first-order Markov chain, one page access corresponds to one state. On the other hand, in a higher-order Markov chain, a plurality of consecutive page accesses form a set, and a set of page accesses corresponds to one state. For example, if each of the pages with page numbers "1", "3", and "4" is accessed in this order, a page sequence {1, 3, 4} corresponds to one state in a higher-order Markov chain. If the page with the page number "7" is accessed next, then the state is transitioned to another state represented by a page sequence {3, 4, 7}.

Similar to the case of the second embodiment, in a higher-order Markov chain, the expected value of each sequence of pages that are sequentially accessed is obtained by calculating the expected value of the occupancy sequence length of each state. The expected value of each page is obtained using the expected value of each page sequence.

Figure 15:
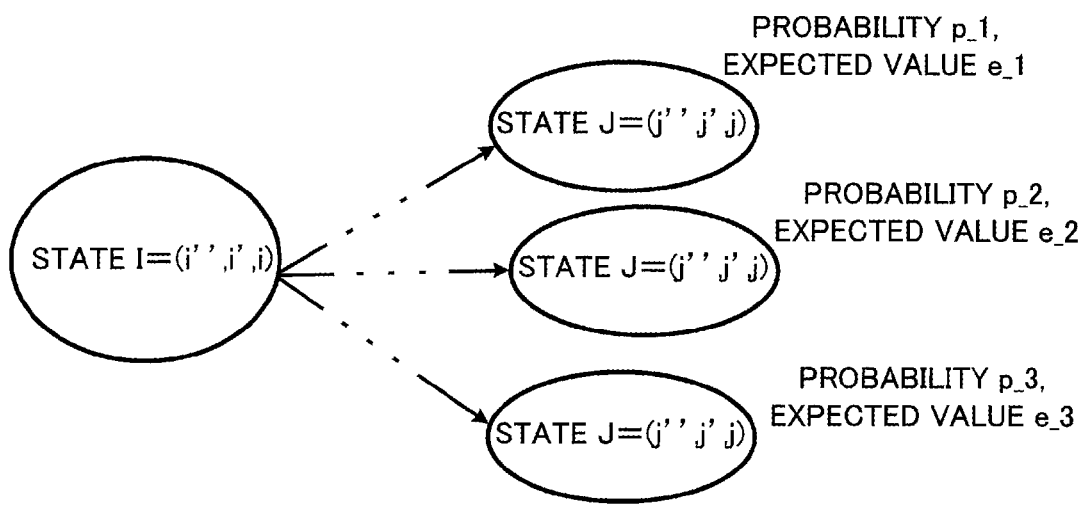
FIG. 15 illustrates an example of calculating the expected value of an occupancy sequence length according to a third embodiment.

FIG. 15 illustrates an example of calculating the expected value of an occupancy sequence length according to the third embodiment. The expected value of the occupancy sequence length from when a page i is accessed to when a page j is accessed is calculated in the following way. The state in which the page i is accessed is I=(i'''', i'', i). The state in which the page j is reached is J=(j'''', j'', j). When there are plural paths to reach the page j, there are plural states J=(j'''', j'', j) in which the page j is reached.

In this case, the expected value calculation unit 130 calculates, for each state J, a probability p of reaching the page j from the page i without passing through the page i. The probability p may be calculated by, for example, multiplying the transition probabilities along each path (transition) from the page i to the page j. Further, the expected value calculation unit 130 calculates, for each state J, the expected value of an occupancy sequence length from the state I to the state J using the same method as in the second embodiment. Then, the expected value calculation unit 130 multiplies, for each state J, the probability of the state J by its expected value, and adds the multiplication results of the plural states J. The expected value calculation unit 130 defines the obtained sum as the expected value of the occupancy sequence length of the page j.

For instance, in the example of FIG. 15, there are three paths to the page j. The probability of the state J corresponding to the first path is "p−1", and the expected value is "e−1". The probability of the state J corresponding to the second path is "p−2", and the expected value is "e−2". The probability of the state J corresponding to the third path is "p−3", and the expected value is "e−3". In this case, the expected value of the page j is "p_1×e_1+p_2×e_2+p_3×e_3".

In this way, even in a higher-order Markov chain, it is possible to calculate an expected value for each page. Further, since pages having high expected values are discarded from the cache area 32 with priority, it is possible to access pages efficiently. Since a higher-order Markov chain is used in the third embodiment, it is possible to more accurately analyze transitions in page access, and thus to more appropriately determine a page to be discarded.

(d) Fourth Embodiment

The following describes a fourth embodiment. In the fourth embodiment, expected values of occupancy sequence lengths are approximated in order to reduce the computation load.

When a large number of pages are stored in the HDD 103, a huge amount of calculation is needed for calculating an inverse matrix in order to obtain expected values, and the like. Further, if a higher-order Markov chain is used as in the third embodiment, the calculation amount is further increased. In view of this, in the fourth embodiment, expected values are approximated in order to reduce the computation amount.

An inverse matrix of I-B is represented by "$(I-B)^{-1}=I+B+B^2+B^3+ \ldots$" Thus, the expected value calculation unit 130 calculates expected values by approximating the inverse matrix as, for example, "$(I-B)^{-1}=I+B+B^2$".

For calculating the expected values, "$I+B+B^2$" is multiplied by an all-one column vector from the right. With this calculation, even in the case where the matrix B has a huge size, if the content is sparse (if the most of elements are "0"), it is possible to calculate expected values in linear time corresponding to the matrix size (the number of rows or columns).

(e) Other Embodiments

In the examples of the second through fourth embodiments, data in the HDD 103 are cached into the memory 102. However, any of the cache algorithms illustrated in the above embodiments may be applied to other combinations of storage devices. For example, even in the case of using a fast access semiconductor memory as a cache in a system having a plurality of semiconductor memories with different access speeds, any of the cache algorithms illustrated in the above embodiments may be applied. Further, even in the case of caching data acquired from another computer connected via a network, any of the cache algorithms illustrated in the above embodiments may be applied. Furthermore, a solid state drive (SSD) may be used in place of the HDD 103.

While particular embodiments of the present invention have been illustrated and described, it would be obvious that the components described in the embodiments may be replaced with other components having similar functions. Further, other arbitrary structures and steps may be added. Further, two or more arbitrary structures (features) of the embodiments described above may be combined.

According to one aspect, it is possible to improve the cache hit rate.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A non-transitory computer-readable storage medium storing a caching program that causes a computer to execute a process comprising:
   storing part of a plurality of data blocks into a cache area of a storage device;
   storing a state transition diagram including a plurality of states in the storage device, the plurality of states each being associated with an access operation to a corresponding one of the plurality of data blocks, the state transition diagram representing a transition probability of each first pair of data blocks of the plurality of data blocks for a transition of states of the each first pair of data blocks, the transition probability being a probability of accessing one of the each first pair of data blocks in succession after accessing another one of the each first pair of data blocks;
   calculating, for each second pair of data blocks of the plurality of data blocks, an expected value of a number of accesses made after one of the each second pair of data blocks is accessed until another one of the each second pair of data blocks is accessed, based on the state transition diagram;
   determining, in response to a first data block being read from outside the cache area according to an access request to the first data block, a second data block to be discarded from the cache area, based on the expected value of the number of accesses made after the first data block is accessed until each of the plurality of data blocks is accessed; and
   removing the second data block to be discarded from the cache area,
   wherein the calculating includes:
   detecting, based on the state transition diagram, one or more paths each including one or more transitions of states of the each second pair of data blocks, the one or more transitions being made after one of the each second pair of data blocks is accessed until another one of the each second pair of data blocks is accessed;
   multiplying, for each of the one or more paths, transition probabilities of the one or more transitions of states included in the each path and a number of the one or more transitions included in the each path; and
   determining a sum of values obtained by the multiplying for the one or more paths of the each second pair of data blocks as the expected value of the each second pair of data blocks.

2. The non-transitory computer-readable storage medium according to claim 1,
   wherein the calculating includes calculating the expected value by generating a transition matrix based on a probability that when each of the plurality of data blocks is accessed, each data block that is likely to be accessed next is accessed next, and by performing a matrix calculation using the generated transition matrix,
   wherein an element in an i-th row and a j-th column j of the transition matrix represents a transition probability from an i-th state to a j-th state, i being an integer of one or greater, j being an integer of one or greater,
   wherein the calculating includes generating a matrix by changing all elements in a k-th column of the transition matrix to zero, k being an integer of one or greater, subtracting the generated matrix from an identity matrix, generating an inverse matrix of a matrix obtained by the subtracting, multiplying the generated inverse matrix by a first column vector in which all elements are one, from right to generate a second column vector, and setting a value of an m-th element of the second column vector as the expected value of the number of accesses made after a data block corresponding to an m-th state is accessed until a data block corresponding to a k-th state is accessed, m being an integer of one or greater.

3. The non-transitory computer-readable storage medium according to claim 1, wherein the determining includes determining, for each of third data blocks stored in the cache area, an expected value of the number of accesses made after the first data block is accessed until the each third data block is accessed, based on the expected value of the each second pair of data blocks of the plurality of data blocks, and determining a third data block having a highest expected value as the second data block to be discarded.

4. The non-transitory computer-readable storage medium according to claim 1, the procedure further comprising:
   generating expected value ranking tables for respective ones of the plurality of data blocks, wherein in an expected value ranking table for one of the plurality of data blocks, identification numbers of different data blocks from the one data block among the plurality of data blocks are arranged in order of an expected value of the number of accesses made after the one data block is accessed until each of the different data blocks is accessed; and
   storing the expected value ranking tables into the storage device;
   wherein the determining of the second data block to be discarded includes determining, in response to the first data block being read from outside the cache area, a data block having a highest expected value listed in an expected value ranking table of the first data block among data blocks stored in the cache area as the second data block to be discarded.

5. The non-transitory computer-readable storage medium according to claim 4, wherein:

each of the expected value ranking tables includes pieces of identification information of a predetermined number of data blocks having lowest expected values; and
the determining of the second data block to be discarded includes determining, in response to the first data block being read from outside the cache, when a third data block that is not listed in an expected value ranking table of the first data block is present in the cache area, the third data block as the second data block to be discarded, and determining, when the third data block is not present in the cache area, a data block having a highest expected value listed in the expected value ranking table of the first data block among the data blocks stored in the cache area as the second data block to be discarded.

6. The non-transitory computer-readable storage medium according to claim 2, wherein the calculating includes calculating the inverse matrix by using an approximate formula.

7. A cache method executed by a computer, the cache method comprising:
   storing, by a processor, part of a plurality of data blocks into a cache area of a storage device;
   storing, by the processor, a state transition diagram including a plurality of states in the storage device, the plurality of states each being associated with an access operation to a corresponding one of the plurality of data blocks, the state transition diagram representing a transition probability of each first pair of data blocks of the plurality of data blocks for a transition of states of the each first pair of data blocks, the transition probability being a probability of accessing one of the each first pair of data blocks in succession after accessing another one of the each first pair of data blocks;
   calculating, by the processor, for each second pair of data blocks of the plurality of data blocks, an expected value of a number of accesses made after one of the each second pair of data blocks is accessed until another one of the each second pair of data blocks is accessed, based on the state transition diagram;
   determining, by the processor, in response to a first data block being read from outside the cache area according to an access request to the first data block, a second data block to be discarded from the cache area, based on the expected value of the number of accesses made after the first data block is accessed until each of the plurality of data blocks is accessed; and
   removing, by the processor, the second data block to be discarded from the cache area,
   wherein the calculating includes:
   detecting, based on the state transition diagram, one or more paths each including one or more transitions of states of the each second pair of data blocks, the one or more transitions being made after one of the each second pair of data blocks is accessed until another one of the each second pair of data blocks is accessed;
   multiplying, for each path, transition probabilities of the one or more transitions of states included in the each path and a number of the one or more transitions included in the each path; and
   determining a sum of values obtained by the multiplying for the one or more paths of the each second pair of data blocks as the expected value of the each second pair of data blocks.

8. A cache apparatus comprising:
   a processor configured to execute a process including:
   storing part of a plurality of data blocks into a cache area of a storage device;
   storing a state transition diagram including a plurality of states in the storage device, the plurality of states each being associated with an access operation to a corresponding one of the plurality of data blocks, the state transition diagram representing a transition probability of each first pair of data blocks of the plurality of data blocks for a transition of states of the each first pair of data blocks, the transition probability being a probability of accessing one of the each first pair of data blocks in succession after accessing another one of the each first pair of data blocks;
   calculating, for each second pair of data blocks of the plurality of data blocks, an expected value of a number of accesses made after one of the each second pair of data blocks is accessed until another one of the each second pair of data blocks is accessed, based on the state transition diagram;
   determining, in response to a first data block being read from outside the cache area according to an access request to the first data block, a second data block to be discarded from the cache area, based on the expected value of the number of accesses made after the first data block is accessed until each of the plurality of data blocks is accessed; and
   removing the second data block to be discarded from the cache area,
   wherein the calculating includes:
   detecting, based on the state transition diagram, one or more paths each including one or more transitions of states of the each second pair of data blocks, the one or more transitions being made after one of the each second pair of data blocks is accessed until another one of the each second pair of data blocks is accessed;
   multiplying, for each of the one or more paths, transition probabilities of the one or more transitions of states included in the each path and a number of the one or more transitions included in the each path; and
   determining a sum of values obtained by the multiplies for the one or more paths of the each second pair of data blocks as the expected value of the each second pair of data blocks.

* * * * *